(12) United States Patent
Kim

(10) Patent No.: US 7,062,300 B1
(45) Date of Patent: Jun. 13, 2006

(54) CELLULAR PHONE HOLDER WITH CHARGER MOUNTED TO VEHICLE DASHBOARD

(76) Inventor: Ki Il Kim, 255 S. Grand Ave., Suite 2004, Los Angeles, CA (US) 90012

( * ) Notice: Subject to any disclaimer, the term of this patent is extended or adjusted under 35 U.S.C. 154(b) by 439 days.

(21) Appl. No.: 09/708,948

(22) Filed: Nov. 9, 2000

(51) Int. Cl.
*H04M 1/00* (2006.01)

(52) U.S. Cl. .............................. 455/569.1; 455/569.2; 455/572; 455/573; 455/575.1; 455/575.9; 455/90.3; 455/344; 455/345; 379/454; 379/455

(58) Field of Classification Search .. 455/569.1–569.2, 455/572–573, 575.1, 575.9, 90.1–90.3, 9; 379/420.04, 449, 446, 454–455
See application file for complete search history.

(56) References Cited

U.S. PATENT DOCUMENTS

| | | | | |
|---|---|---|---|---|
| 4,355,837 A | * | 10/1982 | Shimizu et al. | 296/37.12 |
| 5,143,265 A | * | 9/1992 | Schultz | 224/483 |
| 5,301,224 A | * | 4/1994 | Major | 455/569.2 |
| 5,974,333 A | * | 10/1999 | Chen | 455/569.2 |
| 5,996,866 A | * | 12/1999 | Susko et al. | 224/281 |
| 6,037,746 A | * | 3/2000 | Sheng et al. | 320/104 |
| 6,138,041 A | * | 10/2000 | Yahia | 455/569.2 |
| 6,149,116 A | * | 11/2000 | Won | 248/309.4 |
| 6,304,764 B1 | * | 10/2001 | Pan | 455/569.2 |
| 6,341,218 B1 | * | 1/2002 | Poplawsky et al. | 455/569.1 |
| 6,379,178 B1 | * | 4/2002 | Jones et al. | 439/501 |
| 6,473,631 B1 | * | 10/2002 | Siddoway et al. | 455/575.1 |

* cited by examiner

*Primary Examiner*—Nick Corsaro
*Assistant Examiner*—Tuan Tran
(74) *Attorney, Agent, or Firm*—Fulbright & Jaworski, L.L.P.

(57) ABSTRACT

In a vehicle, means of mounting a cell phone on the vehicle dashboard with minimal wiring and external connections, using manufacturer power connections made available on the dashboard. The mounting means is either an after market accessory addition to the vehicle or a option available at the time of purchase to render easy and convenient mounting of the cell phone without loose wires and providing proper positioning of a video camera built into the cell phone. The cell phone is positioned for viewing either through the windshield or backward onto the occupants enabling monitoring accidents between vehicles, the result of an accident on the occupants of the vehicle or for security monitoring of the trespassers within the vehicle. This is accomplished by mounting the camera at the dashboard. Another advantage is to improve the power output of the cell phone by positioning the antenna (part of the hand held cell phone device) near the windshield.

24 Claims, 5 Drawing Sheets

FIG. 2A
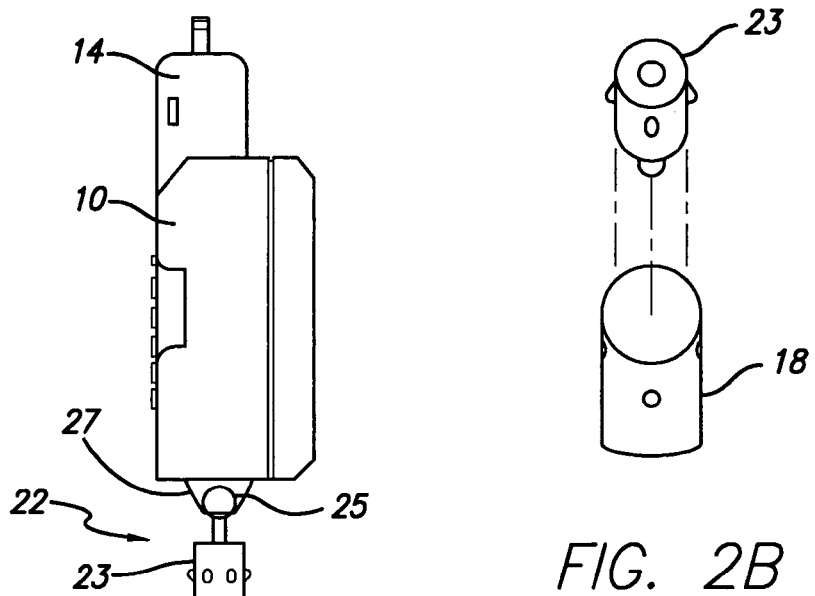
FIG. 2B
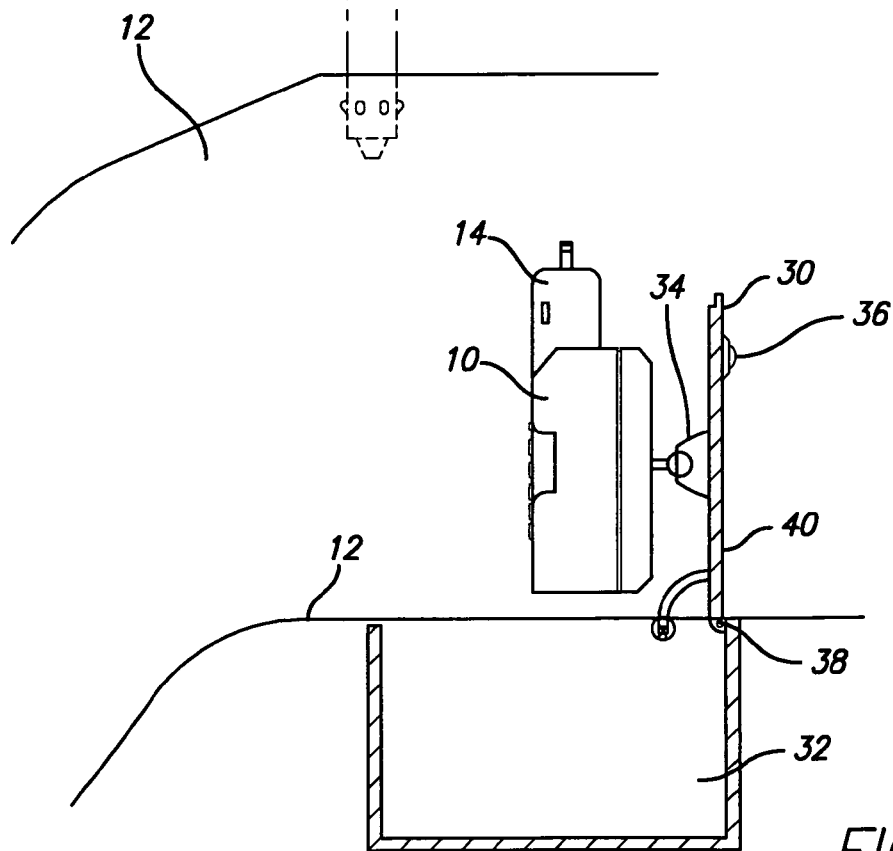
FIG. 3

CELLULAR PHONE HOLDER WITH CHARGER MOUNTED TO VEHICLE DASHBOARD

RELATED DISCLOSURE DOCUMENT

A Disclosure Document No. 479497 was filed in the Patent and Trademark Office on Sep. 5, 2000.

BACKGROUND OF THE INVENTION

1. Field of the Invention

The present invention provides a vehicle mounting device and, in particular, a mounting device located on or in a vehicle dashboard for holding and powering a cell phone.

2. Description of the Prior Art

As the number of technology innovations increase, more devices are developed specifically for use in vehicles or sufficiently compact to be used in the vehicle. The devices may be placed on vehicle dashboards and powered, either directly or indirectly, via the vehicle cigarette lighter. A likelihood exists that vehicle manufacturers may add a second cigarette lighter on top of the dashboard to accommodate these devices without eliminating the cigarette lighter function. Further, cell phones are being developed with video cameras built in for conveying image data over the cell phone audio channel. Although conceptually there is a need for a built-in accessory or an add-on accessory platform that bolts onto the dashboard to support and power these cellphones, a power connection is still required. Direct wiring to the cigarette lighter would leave dangling wires, marring the appearance of the vehicle interior. U.S. Pat. No. 5,687,234 to Chang discloses a charger for a mobile phone wherein the charger case, in one embodiment, couples the phone to the vehicle lighter socket. The charger is a separate unit and not attached to the vehicle itself.

What is thus desired is to provide a mounting device associated with the vehicle dashboard for holding and powering electronic devices that are capable of use within a vehicle, and, in particular, to hold and power cell phones.

SUMMARY OF THE PRESENT INVENTION

The present invention provides an accessory platform, or mounting, either bolted onto the exterior of a vehicle dashboard or built into the vehicle dashboard either as an after market accessory or offered as an option in a vehicle being purchased to hold and power cell phones.

The video camera portion of a cell phone having this feature is positioned to view, or scan, through the windshield or towards the back of the vehicle and its interior.

DESCRIPTION OF THE DRAWING

For better understanding of the present invention as well as other objects and further features thereof, reference is made to the following description which is to be read in conjunction with the accompanying drawing therein.

FIG. 2A is a side elevation of the mounting device shown in FIG. 1 and FIG. 2B illustrates the mounting socket utilized in the present invention;

FIG. 3 is a side elevational view/partial cross-sectional view illustrating one version of the mounting device of the present invention in the open position;

DESCRIPTION OF THE INVENTION

Figure 1:
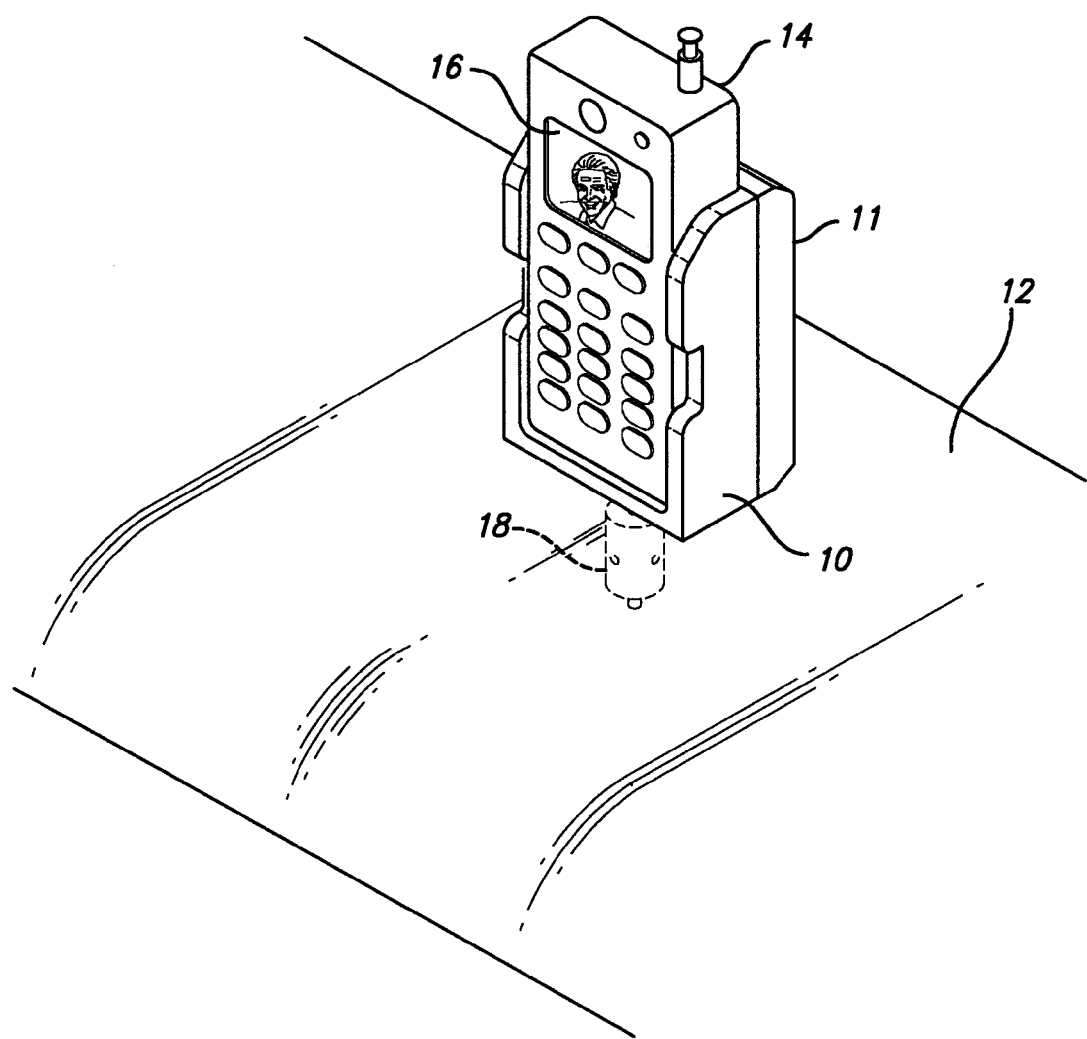
FIG. 1 is a perspective view of the video cell phone mounting device of the present invention.

Referring now to FIGS. 1, 2A and 2B, a preferred embodiment of the present invention is illustrated. In particular, a holder 10 with charger 11 is shown positioned on the top of a vehicle dashboard 12. A cell phone 14 having a video camera 16 is shown positioned in holder 10 (the holder of the present invention can be used with conventional cell phones not incorporating a video camera). As illustrated, a cigarette lighter plug 18 is positioned within dashboard 12, holder 10 being positioned such that power unit 23 associated with holder 10 can be inserted into the lighter plug 18. It should be noted that cell phone 14 may either be charged or have its own power source, thus not requiring the use of the holder power unit. A ball joint interface 22 to plug 18 allows the holder 10, and thus video camera 16, to be adjusted to provide various angles of view (alternate techniques are available for providing two axis of rotation). Ball joint interface 22 comprises a male ball retainer having a ball element 25 and a female retainer portion 27. A receptacle jack (not shown) is built into dashboard 12. Holder 10 is attached via ball joint 22 to the cigarette lighter plug 18 and power is conveyed via positive and negative contacts formed as part of the conventional cigarette lighter outlet.

FIG. 3 illustrates a second embodiment of the invention wherein the holder 10 is mounted to the inside cover 30 of a compartment, or housing, 32 formed on the top of vehicle dashboard 12 via a ball type swivel device 34 and shown in the open position. A door handle 36 enables the door 30 to be open or closed; hinge 38 connects cover 30 to compartment 32; and angle adjuster 40 enables the cover to be fixedly closed and full opened (shown) positions.

Figure 4:
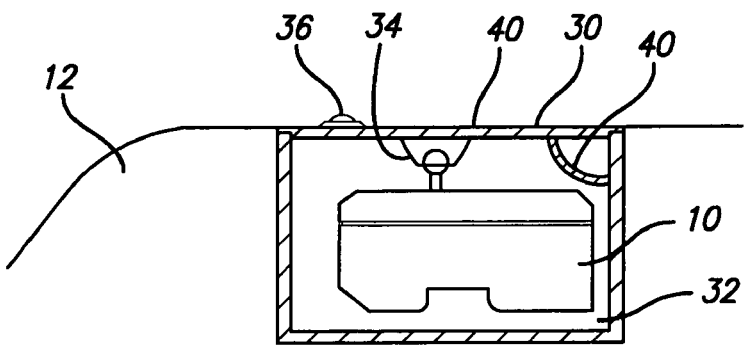
FIG. 4 illustrates the mounting device shown in FIG. 3 in the closed, or storage, position.

FIG. 4 is similar to FIG. 3 showing holder 10 within compartment 32 in the closed, or stored, position.

Figure 5:
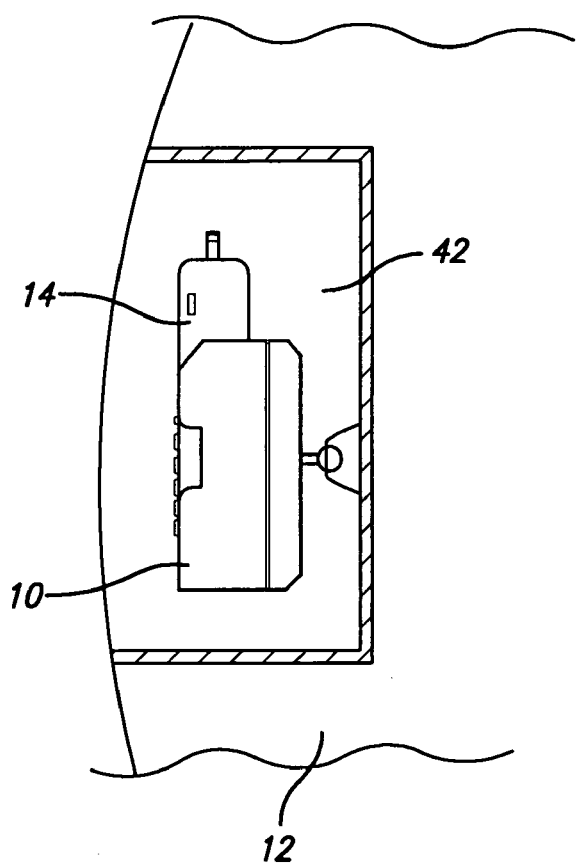
FIG. 5 is a third embodiment of the mounting device of the present invention.

FIG. 5 illustrates a third embodiment of the present invention wherein holder 10 is mounted within a compartment, or housing, 42 formed in dashboard 12. The compartment 42 is accessible by a user from the front of the dashboard 12.

Figure 6:
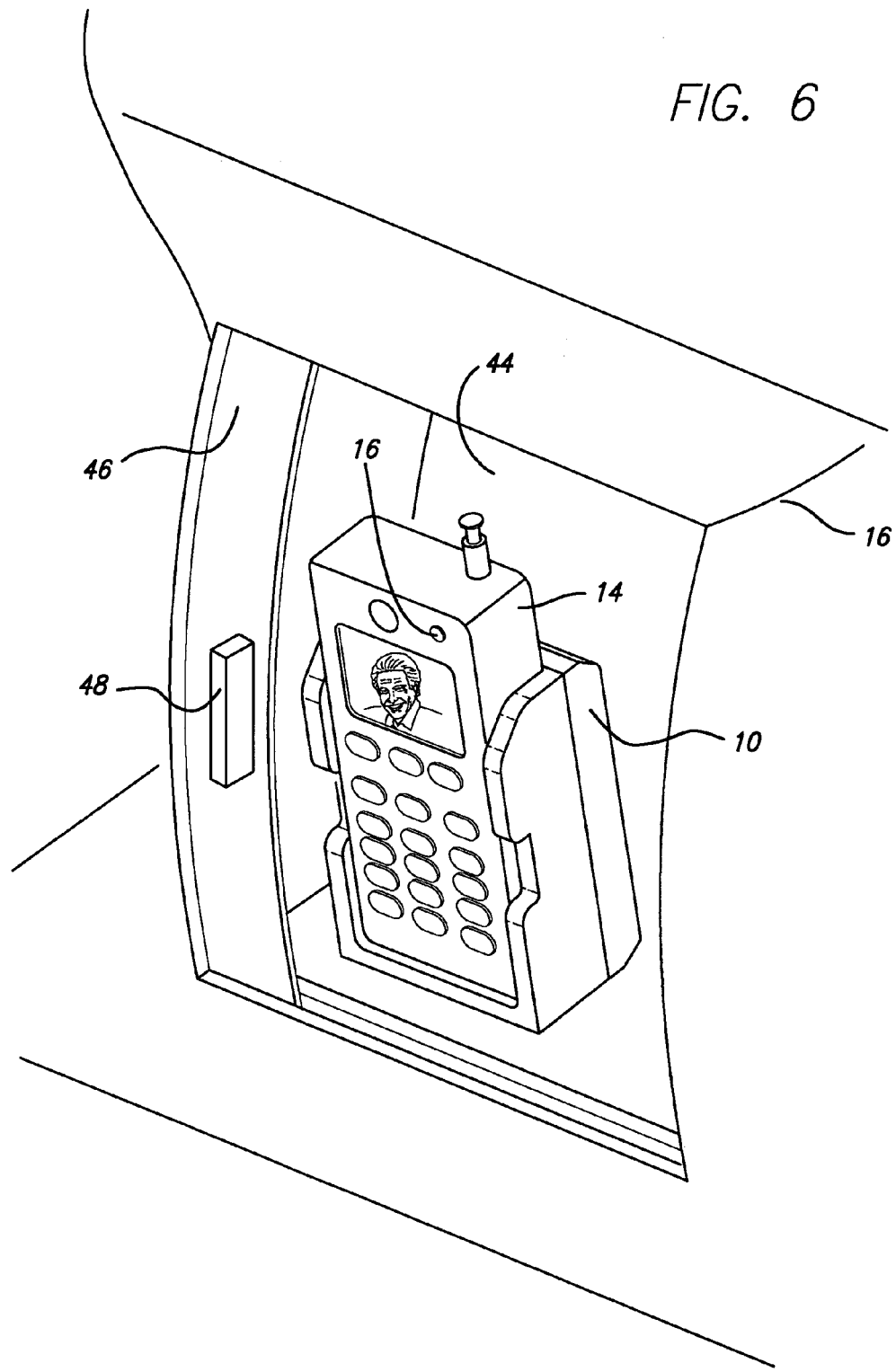
FIG. 6 is a perspective view of the embodiment shown in FIG. 5 with a cover creating a fourth embodiment.

FIG. 6 illustrates a fourth embodiment wherein the cell phone 14 is mounted on holder 10 within compartment, or housing, 44 formed in dashboard 12. A sliding door 46 with handle 48 encloses compartment 44 to provide a pleasing appearance when cell phone 14 is not in use. Note that in this version the video camera 16 can only view the interior of the vehicle.

Figure 7:
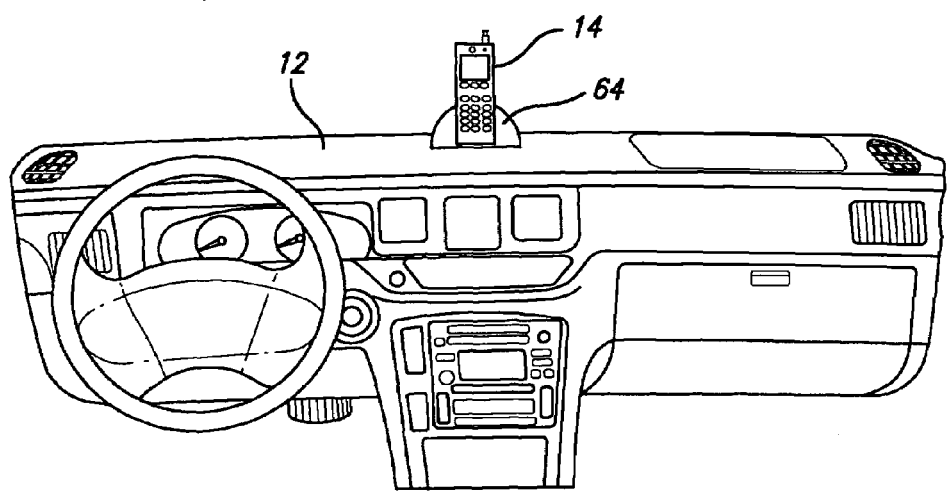
FIG. 7 is a perspective view of a vehicle dashboard showing a cell phone holder and charger mounted to the vehicle dashboard in a fifth embodiment.

FIG. 7 is a perspective view showing the holder/charger 10 shown in FIG. 1 positioned on the top of dashboard 12 in a fifth embodiment.

Figure 8:
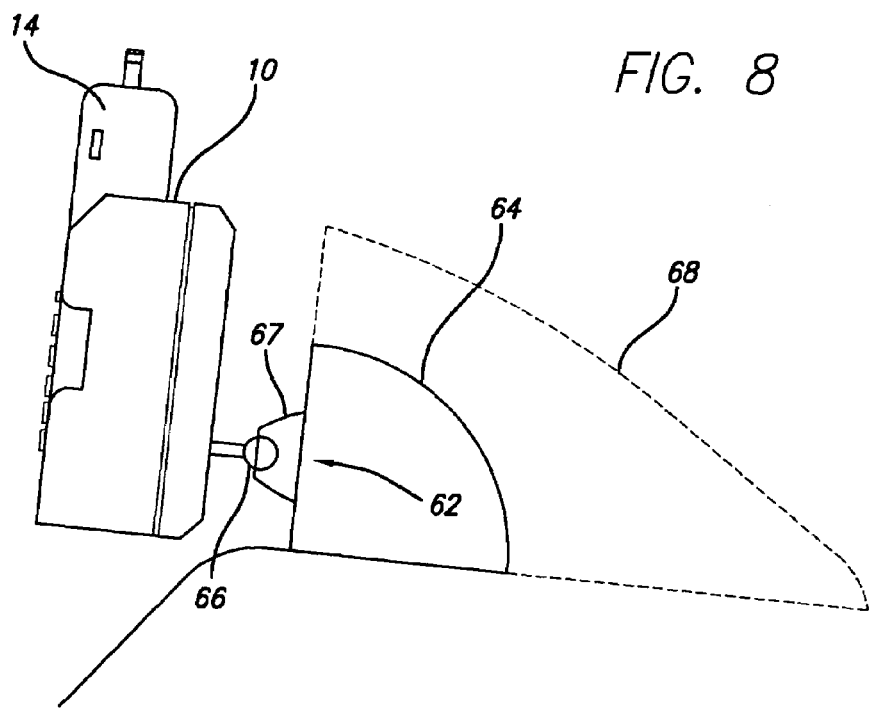
FIG. 8 is the fifth embodiment of the mounting device of the present invention.

FIG. 8 is the fifth embodiment of the present invention. In particular, holder/charger 10 is mounted, via ball type angle adjuster 62, to a raised dashboard component 64 via a ball-joint 66 towards the front of dashboard 12. The dashed lines show an optimal dashboard extension which raises the height of dashboard 12 enabling the video camera 16 to be better positioned to view the interior of the vehicle.

Note that the cell phone may be hung from the vehicle rear view mirror or on the windshield; means to stabilize and dampen the swinging effects that would occur can be provided. Power connections are supplied at the rear view mirror, sun visor or the windshield.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A cell phone holding and charging device for a vehicle dashboard having an upper surface, comprising;
   a holder having a shape for receiving and supporting a cell phone in a manner leaving the control and display functions of the cell phone visible and accessible,
   said holder having an electrical connector for operably receiving a charger connector of the cell phone when the cell phone is received and supported in said holder,
   a support provided at the upper surface of the vehicle dashboard,
   said support having a connecting joint supporting said holder above the upper surface of the dashboard for adjustable movement of said holder about at least a vertical axis and an axis lateral to the vehicle for allowing adjustment of the cell phone to face various areas of the interior of the vehicle, and
   said support including an electrical connection to said electrical connector of said holder for supplying charging and operating current to the cell phone when the cell phone is received and supported in said holder.

2. The cell phone holding and charging device of claim 1, wherein said electrical connection of said support is connected to the battery of the vehicle.

3. The cell phone holding and charging device of claim 1, wherein said support includes a cigarette lighter socket mounted in the upper surface of the dashboard and a cigarette lighter plug for fitting into said cigarette lighter socket, and said connecting joint is provided on said cigarette lighter plug.

4. The cell phone holding and charging device of claim 1, wherein said support includes a compartment below the upper surface of the dashboard and a cover on said compartment, said cover being operable to an open and generally vertical position extending above the upper surface of the dashboard, and said connecting joint is provided on an inner side of said cover whereby said holder is received in said compartment in the closed position of said cover.

5. The cell phone holding and charging device of claim 1, wherein said support includes a raised portion on the upper surface of the dashboard, said connecting joint mounted to said raised portion and extending rearwardly to connect to and support said holder.

6. The cell phone holding and charging device of claim 1, wherein said connecting joint includes a ball joint connector.

7. The cell phone holding and charging device of claim 1, wherein said holder is supported by said support to hold the cell phone in a generally vertical position.

8. The cell phone holding and charging device of claim 1, wherein said holder supports said cell phone in a manner for allowing the vehicle driver to view the cell phone display screen.

9. A cell phone holding and charging device for a vehicle dashboard having an upper surface, comprising;
   a holder having a shape for receiving and supporting a cell phone in a manner leaving the control and display functions of the cell phone visible and accessible,
   said holder having an electrical connector for operably receiving a charger connector of the cell phone when the cell phone is received and supported in said holder,
   a support provided on and extending upwardly from the upper surface of the vehicle dashboard,
   said support having a connecting joint extending rearwardly of said support and connected to said holder for supporting said holder above the upper surface of the dashboard for adjustable movement of said holder for the cell phone to face at least plural passenger areas of the interior of the vehicle, and
   said support including an electrical connection to said electrical connector of said holder for supplying charging and operating current to the cell phone when the cell phone is received and supported in said holder.

10. The cell phone holding and charging device of claim 9, wherein said support electrical connection of said support is connected to the battery of the vehicle.

11. The cell phone holding and charging device of claim 9, wherein said support is at least as wide as said holder.

12. The cell phone holding and charging device of claim 9, wherein said support is at least as high as said holder.

13. The cell phone holding and charging device of claim 12, wherein said support includes upper and side surfaces that are inclined to the upper surface of the dashboard.

14. The cell phone holding and charging device of claim 9, wherein said support is provided as an integral portion of the vehicle dashboard.

15. The cell phone holding and charging device of claim 9, wherein said support is provided as a separate component mounted on the upper surface of the dashboard.

16. The cell phone holding and charging device of claim 9, wherein said connecting joint provides adjustable movement of said holder about at least a vertical axis and an axis lateral to the vehicle.

17. The cell phone holding and charging device of claim 9, wherein said connecting joint includes a ball joint connector.

18. A cell phone holding and charging device for a vehicle having a dashboard with an upper surface extending laterally of the vehicle, comprising:
   a support provided on the upper surface toward the lateral middle of the vehicle dashboard, said support extending upwardly from the plane of the upper surface;
   a holder having a shape for receiving and supporting a cell phone in a manner that allows visible and physical access to the operating control and display functions of the cell phone, said holder having an electrical connector for operably connecting to a charger connection jack of the cell phone when the cell phone is received and supported in said holder;
   a connecting joint extending rearwardly from said support and connected to said holder for supporting said holder and cell phone above the upper surface of the dashboard, said connecting joint being adjustable for allowing pivotal movement about at least a vertical axis and an axis lateral to the vehicle for adjustably facing said cell phone toward at least each front seat in the vehicle; and
   an electrical connection permanently provided between said electrical connector in said holder and the battery of the vehicle through said support for supplying electrical current to the cell phone for operating and charging the cell phone when the cell phone is received and supported in said holder.

19. The cell phone holding and charging device of claim 18, wherein said support is at least as wide as said holder.

20. The cell phone holding and charging device of claim 18, wherein said support is at least as high as said holder.

21. The cell phone holding and charging device of claim 20, wherein said support includes upper and side surfaces that are inclined to the upper surface of the dashboard.

22. The cell phone holding and charging device of claim 18, wherein said support is provided as an integral portion of the vehicle dashboard.

23. The cell phone holding and charging device of claim 18, wherein said support is provided as a separate component mounted on the upper surface of the dashboard.

24. The cell phone holding and charging device of claim 18, wherein said connecting joint includes a ball joint connector.

* * * * *